: 3,294,851
SEPARATION OF PRIMARY AND SECONDARY
HYDROCARBON CHLORIDES
Norman R. Roobol, Walnut Creek, and Rupert C. Morris, Berkeley, Calif., assignors to Shell Oil Company, New York, N.Y., a corporation of Delaware
No Drawing. Filed Apr. 20, 1964, Ser. No. 361,223
3 Claims. (Cl. 260—652)

This invention relates to a process for separating chlorides of hydrocarbons. More particularly the invention is related to a process for separating mixtures of primary and secondary aliphatic hydrocarbon chlorides.

Chlorinated higher aliphatic hydrocarbons are useful in the preparation of olefinic hydrocarbons, important uses of which are in the manufacture of higher alcohols and alkylaromatics. In practice, hydrocarbon chlorides are prepared by well known methods of substitutive chlorination of aliphatic hydrocarbons. The reaction products obtained in the chlorination of essentially normal paraffins are mixtures of primary and secondary chlorides with the secondary chlorides usually accounting for the major amount of the mixture. Often up to 85% or more of the resulting chlorides may be secondary. In the process of preparing olefins the hydrocarbon chlorides are then dehydrochlorinated. The primary chlorides are quite resistant to dehydrochlorination and up to 50% or more of the primary chlorides may not be converted under the usual conditions; more drastic conditions result in undesirable side reactions. In recovering the olefins, the unconverted chlorides remain behind in the distillation bottoms mixture, from which separation of the valuable primary chlorides is difficult and costly. The hydrocarbon dehydrochlorination process normally, thus, results in the loss of a significant amount of the valuable primary hydrocarbon chlorides. Steps taken to physically separate the primary and secondary chlorides from one another after the chlorination step and/or in the distillation bottoms mixture are impractical due to the similarity in physical properties such as boiling points, etc.

It is thus desirable and an object of this invention to provide a process whereby mixtures of primary and secondary hydrocarbon chlorides may be efficiently and economically separated into separate primary and secondary compounds. It is also an object of the invention to provide a process whereby primary hydrocarbon chlorides may be recovered as primary hydrocarbyl compounds from hydrocarbon dehydrochlorination reaction bottoms also containing secondary hydrocarbon chlorides. These objects will be better understood and others will become apparent from the following description of the invention.

Now in accordance with this invention, primary and secondary higher paraffin hydrocarbon chlorides may be separated from mixtures thereof by treating the mixture with a dialkyl amine wherein each alkyl group contains from one to four carbon atoms, whereby the primary chlorides are selectively converted to corresponding tertiary amines and their hydrochloride salts which are separable by aqueous extraction as the salts thereof from the secondary chlorides.

The hydrocarbon materials from which the chlorides are prepared are saturated aliphatic hydrocarbons containing from 10 to 30 carbon atoms and mixtures thereof. Especially useful are paraffins having from 12 to 20 carbon atoms from which the corresponding primary and secondary alkyl chlorides are obtained. Thus chloride mixtures which will be treated according to the invention are mixtures of primary and secondary chlorides of decane, undecane, dodecane, tridecane, tetradecane, pentadecane, etc., and mixtures thereof. Accordingly, specific mixtures of aliphatic hydrocarbon chlorides which may be treated comprise for example 1-chlorodecane and 3-chlorodecane, 1-chlorododecane and 2-chlorododecane and the like. The mixtures may contain alkyl chlorides, such as, for example, 1-chlorodecane and 2-chlorododecane or 1-chlorotridecane and 3-chlorodecane, etc. The mixtures may be mixtures of, e.g., $C_{11-14}$ secondary and primary alkyl chlorides, $C_{12-15}$ secondary and primary alkyl-chlorides, etc.

The amines used to treat the hydrocarbon chloride mixtures are dihydrocarbylamines, preferably dialkylamines, having up to 8 carbon atoms. These amines may be represented by the formula $$R_1R_2NH$$

wherein $R_1$ and $R_2$ are hydrocarbyls, preferably alkyls, of from one to four carbon atoms. The amines where $R_1$ and $R_2$ are alike are especially useful, but the alkyls can be different. Thus, the amines used in this process include dimethylamine, diethylamine, dipropylamine, dibutylamine, methylethylamine, diallylamine, methylallylamine, dimethallylamine and dicrotylamines. Dimethylamine is preferred.

The method of this invention whereby primary chlorides are separated from secondary chlorides is accomplished by merely heating the dialkylamine with a composition containing a mixture of the chlorides, and separating the resulting tertiary amines of the primary chlorides from the unchanged secondary chlorides. The primary higher alkyl chlorides (RCl) will react with the dialkyl amine ($R_1R_2NH$) to form the corresponding trialkyl tertiary amine, $RR_1R_2N$, which may be present as the hydrochloride salt, $RR_1R_2N \cdot HCl$.

The secondary or internal higher alkyl chlorides of the mixture are substantially unreactive with the dialkylamines under the process conditions and remain in the mixture unchanged. The tertiary amine may be then separated from the reaction mixture by any suitable means, a particularly useful method being extraction as the hydrochloride salt in aqueous hydrochloric acid.

The method according to this invention may be accomplished at various temperatures. The temperature may be from about 20° C. to about 350° C. and preferably between about 100° C. and about 225° C. At temperatures above about 225° C., the secondary hydrocarbon chlorides are dehydrohalogenated to olefins. The hydrogen chloride which is correspondingly released as a result of this thermal dehydrohalogenation reaction adds to the dialkylamine present to form the corresponding dialkylamine hydrogen chloride, thus interfering somewhat with reaction of the primary chloride with the secondary amine. Thus, as a practical matter it may be more desirable to keep the reaction temperature below about 225° C. to avoid the necessity of using greater amounts of dialkylamine even though the process is carried out quite well at higher temperatures.

Pressure within the reaction zone may be atmospheric, subatmospheric or superatmospheric. In a closed reaction vessel the dialkylamine will build up vapor pressure where the reaction temperature is above its boiling point and at higher temperatures a closed reaction vessel is preferred. Generally, the maximum pressure buildup within the closed reaction zone will be about 200 p.s.i.g. at temperatures below about 225° C.

The dialkylamine may be charged in liquid form or injected under pressure as a gas to a reaction vessel containing the mixture of primary and secondary hydrocarbon chlorides. The reaction vessel may be equipped with a means of stirring or otherwise agitating the reaction mixture. After the reaction is complete the product mixture may be cooled and filtered to remove any solid material formed such as dialkylamine hydrochloride. The tertiary amine may then be separated from the secondary hydrocarbon chloride (or olefin) by a convenient method such as adding dilute hydrochloric acid to the reaction mixture. The tertiary amine is soluble in the aqueous hydrochloric acid while the hydrocarbon chloride or olefin material is not soluble. The tertiary amine is recoverable as such from the aqueous extract merely by alkalizing with caustic soda or ammonia and phase separating the released water insoluble tertiary amine and the aqueous phase.

The tertiary amine products are valuable materials which have a number of important uses, for example, as surface active agents. They are especially useful in the direct preparation of tertiary amine oxides which are used in detergent compositions as foaming and emulsifying agents.

The amount of dialkylamine should, in general, be at least the mole equivalent of the amount of primary chloride present. However, during the process, for every mole of dialkylamine, reacted with a mole of primary chloride, there is given off a mole of hydrogen chloride. Since a portion of this free hydrogen chloride may form an insoluble salt with a portion of the dialkylamine and reduce its availability for reaction with the primary chloride, the use of a larger proportion of dialkylamine is advantageous; an amount of dialkylamine at least equal to twice the molecular equivalent of primary chloride is preferred. The preferred mole ratio of dialkylamine to primary hydrocarbon chlorides is between about 2:1 and 60:1. Larger amounts of the dialkylamine may be used but as a practical matter are not necessary. It has been found that the reaction will proceed more directly and efficiently where substantial molar excess of dialkylamine is used, the excess of dialkylamine providing an excellent solvent medium for the reaction.

If desired, although usually not required, the reaction may be carried out in a common organic solvent which is relatively inert and will not interfere with the reaction such as, for example, alcohols, tetrahydrofuran, dioxane and liquid aliphatic and/or aromatic hydrocarbons.

The following examples will illustrate the nature and advantages of the process of the invention. It should be understood however, that the examples are merely illustrative and are not to be regarded as limitations since the basic teachings thereof may be varied as will be understood by one skilled in the art to which it pertains.

Example I 57 grams (0.28 mole) of a mixture of monochlorinated dodecanes containing about 16.6% of 1-chlorododecane was placed into a one liter stainless steel autoclave equipped with a mechanical stirrer. 100 grams of dimethylamine (2.27 mole) was added to the reaction vessel which was then closed and heated to 200° C. Stirring was initiated and the temperature was maintained while the reaction was allowed to proceed for about 5 hours. The reaction vessel was then allowed to cool to room temperature and the excess dimethylamine was removed by vaporization. The product was then filtered to remove solid material. To the liquid mixture was then added dilute hydrochloric acid and the mixture well mixed to insure complete solution of the tertiary alkyl amine. The separated hydrochloric acid layer was then neutralized with ammonium hydroxide liberating the dimethyldodecylamine. Analysis of the separated products and a material balance showed that all of the primary alkyl chloride had been converted to tertiary amines while essentially none of the secondary chloride had reacted.

Example II

A one liter stirred autoclave was charged with 174 grams of $C_{12}$ dehydrochlorination bottoms (from dehydrochlorination of monochlorinated $C_{12}$-paraffin) containing a mixture of primary and secondary $C_{12}$ chlorides (43.4% primary $C_{12}$ chloride) and 156 grams of dimethylamine and heated slowly from 20° to 200° C. in 4 hours. The temperature was maintained for 1 hour after which time the reaction was allowed to cool to room temperature. The excess dimethylamine was distilled off and the liquid residue filtered and added to 600 ml. of 3 N HCl with stirring. The acid insoluble layer (47.9 grams) was separated and the acid solution neutralized with ammonia. The liberated dimethyldodecylamine weighed 85.0 grams. Conversion of the primary $C_{12}$ chlorides was 100% while none of the secondary chlorides were converted.

Example III 50.0 grams of a mixture of monochlorinated dodecane (0.245 mole) having 16.6% of 1-chlorododecane was sealed in a glass tube with 100 grams (2.27 moles) of dimethylamine for one week at 22° to 24° C. The excess dimethylamine was then distilled off and the residual liquid was filtered to separate crystals of dimethylamine hydrochloride. The filtrate was stirred into 400 ml. of 3 N HCl and the acid insoluble material separated. The aqueous acid solution was neutralized with ammonia to liberate the tertiary amine. 7.8 grams of dodecyldimethylamine was obtained which was 94% of the theoretical amount based on the amount of 1-chlorododecane in the charge.

Analysis showed the acid insoluble portion of the reaction mixture to contain 98% secondary $C_{12}$ chlorides.

Example IV 115 grams of bottoms obtained from a dehydrochlorination process containing 43.4% primary $C_{12}$ chloride and 45 grams of dimethylamine were heated at 200° C. in a stirred autoclave for 5¾ hours. The reaction vessel was then allowed to cool to room temperature after which the product was treated as described in Example II. Analysis showed that about 95% of the primary $C_{12}$ chloride had been converted to the tertiary amine while the secondary chlorides had not reacted.

As has been described this method of treating compositions containing mixtures of primary and secondary aliphatic hydrocarbon chlorides affords very selective separation of the two materials the primary chlorides being recovered as valuable tertiary amines.

We claim as our invention:

1. The process for resolving a mixture consisting essentially of primary and secondary alkyl chlorides having from ten to thirty carbon atoms in the molecule, which consists essentially of contacting said mixture with a dialkylamine having up to four carbon atoms in each alkyl group, at a temperature of from about 20° to about 350° C., in a molar ratio of said dialkylamine to said primary alkyl chloride of from about 2:1 to about 60:1, thereby selectively reacting said primary alkyl chloride with said dialkylamine with the formation of a reaction mixture comprising the tertiary alkylamine corresponding to said primary alkyl chloride with said dialkylamine, and separating said tertiary alkylamine from said reaction mixture.

2. The process for resolving a mixture consisting essentially of primary and secondary alkyl chlorides having from ten to twenty carbon atoms to the molecule, which consists essentially of contacting said mixture with dimethylamine at a temperature of from about 100 to about 225° C., in a molar ratio of dimethylamine to said primary alkyl chloride of from about 2:1 to about 60:1, thereby selectively reacting said primary alkyl chloride with dimethylamine with the formation of the dimethylalkylamine corresponding to said primary alkyl chloride while leaving said secondary alkyl chloride substantially unchanged, and separating said dimethylalkylamine from the resulting reaction mixture.

3. The process in accordance with claim 2 wherein said mixture of primary and secondary alkyl chlorides is a mixture of primary and secondary monochloro-dodecanes and said dimethylalkylamine is dimethyldodecylamine.

References Cited by the Examiner

UNITED STATES PATENTS

| | | | |
|---|---|---|---|
| 2,006,058 | 6/1935 | Olin | 260—585 |
| 2,349,752 | 5/1944 | Pollack | 260—652 |
| 2,448,910 | 9/1948 | Reamer | 260—585 X |
| 2,569,984 | 10/1951 | Fetterly | 260—652 X |
| 3,223,734 | 12/1965 | Fallstad et al. | 260—583 |

OTHER REFERENCES

Astle: Industrial Organic Nitrogen Compounds, 1961, pp. 3–7.

Sidgwick: Organic Chemistry of Nitrogen, 1945, pp. 13–14.

LEON ZITVER, *Primary Examiner.*

K. V. ROCKEY, *Assistant Examiner.*